Oct. 20, 1931.    T. L. MacBEAN    1,828,287
METHOD OF MAKING BOLTS AND SIMILAR CONNECTING DEVICES
Filed March 9, 1928
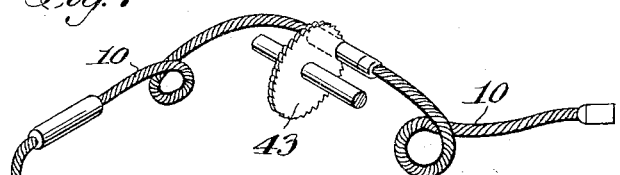
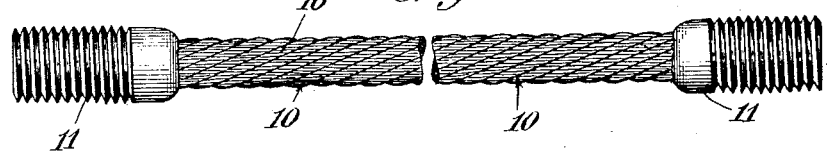
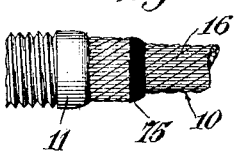
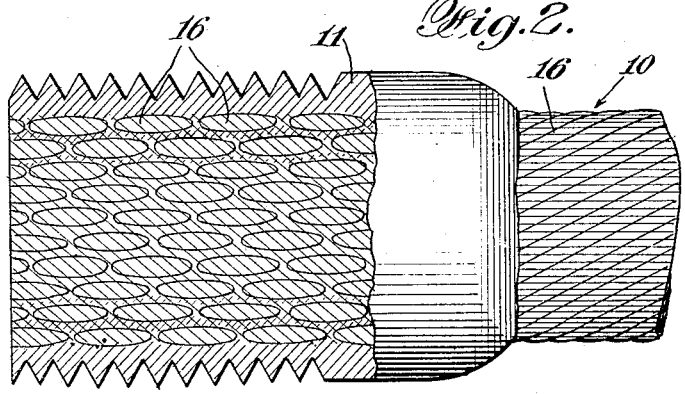
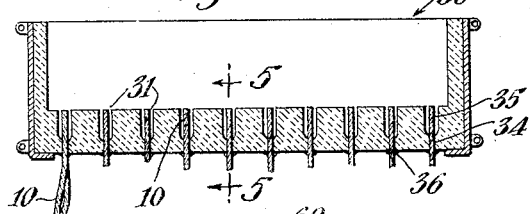
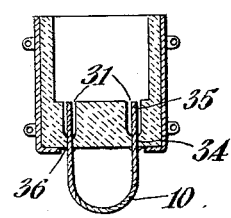
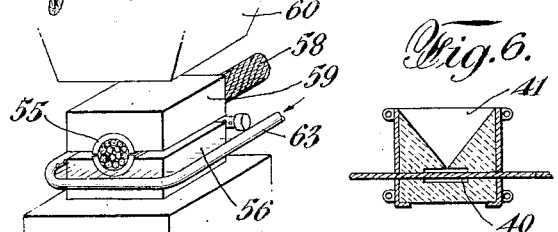
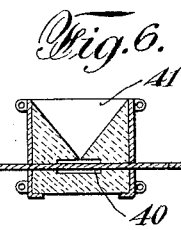
INVENTOR.
Thomas Leonard MacBean
BY Sheldon H. Graves.
his ATTORNEY Patented Oct. 20, 1931

1,828,287

UNITED STATES PATENT OFFICE

THOMAS LEONARD MACBEAN, OF NEW YORK, N. Y., ASSIGNOR TO WELDBUILT CORPORATION, OF NEW YORK, N. Y., A CORPORATION OF NEW YORK

METHOD OF MAKING BOLTS AND SIMILAR CONNECTING DEVICES

Application filed March 9, 1928. Serial No. 260,467.

This invention relates to bolts or similar connecting devices and has for its principal object to provide an improved bolt having a flexible shank and also to provide an improved method of making such bolt.

The bolt constructed in accordance with the present invention is designed for many uses for which it would be impracticable or impossible to employ a rigid or inflexible bolt. Thus, in many cases, in securing parts together, it is not possible to provide the parts with bolt holes which are straight or otherwise of such form that a rigid bolt may be inserted through the openings. My improved bolt, however, being flexible may be inserted through bolt holes regardless of the forms of the holes or their position relative to one another.

A further object of my invention is to provide a bolt having a flexible shank and rigid ends securely united to the shank, both of which ends may be screw-threaded for the reception of nuts or, if desired, one of the ends formed as a bolt head and the other end screw-threaded for the reception of a nut. A further object of my invention is to provide a connecting device having a flexible shank and rigid ends securely and integrally united to the shank, one or both of which ends may be formed as a hook or eye or similar means for connecting the end of the shank to some other structure.

A further object of my invention is to provide a bolt or other connecting device of this character wherein the rigid ends are united to the shank by a joint having a tensile strength approximately equal to or greater than the tensile strength of the flexible shank, thereby eliminating danger of the end breaking away from the shank when the bolt or other device is used.

A further object of my invention is to provide a bolt of this character wherein the flexible shank is formed of stranded steel cable, and wherein the ends of the cable are formed by a solid mass of steel which extends around and between the strands of the cable and is so intimately united with the metal of the strands as to form therewith a unitary consolidated and, if desired, a homogeneous structure.

I am aware that devices have been employed for attaching the ends of cables to supports or other structures, but such devices, of the character heretofore employed, have been entirely unfitted for use in many cases where it would be desirable to employ a bolt. Many of such devices as, for example, devices which are clamped to the ends of the cable or are secured to the cable by splicing, are complicated in construction, expensive and because of their large size cannot be used in many places where available space is limited. Furthermore, many of such devices are incapable of ready adjustment for tightening as is possible with a bolt and nut. Others of such devices, such as terminal connectors for forming electrical contact with the cable, are entirely incapable of resisting any considerable tensile strain.

By the use of the present invention, however, I overcome these disadvantages, and provide a bolt which is simple and strong in construction and is inexpensive to manufacture. It may be applied to the parts to be connected, and may be tightened, with the same facility as the ordinary bolt, and at the same time it is adapted for uses for which the ordinary bolt is unfitted.

My improved bolt is preferably formed by welding masses of metal to the ends of the cable shank. In case it is desired to form a bolt head at one end of the cable, a mass of metal of rectangular or hexagonal section is united to the cable by welding, and, in case it is desired to form a screw-threaded end, a mass is united by welding to the end of the cable and the added metal is then turned to cylindrical form and screw-threaded. In practice I preferably employ the so-called thermit process for joining masses of metal to the wires or strands of the cable. The ends of the cable are placed in a suitable mold and the usual thermit mixture containing iron oxide and aluminum is packed around the cable ends and between the strands, and the mass is ignited. The ferric material so formed becomes intimately united with the metal of the strands and upon cooling forms with the strands a strong consolidated structure.

In certain cases in forming the rigid ends I may also employ with satisfactory results an oxy-acetylene weld or an arc weld. The mass of added metal may also in certain cases be welded to the strands of the cable by hammer welding, as will be more fully described hereafter.

Objects and advantages of my invention other than those above noted will appear from the following description taken in connection with the accompanying drawings wherein:

Figure 1 is an enlarged elevation of the flexible bolt.

Figure 2 is an enlarged detail view of one end of the bolt, partly in section and partly in elevation.

Figure 3 is a side elevation of one end of a bolt showing a modification of my invention.

Figure 4 is a longitudinal sectional view of a multiple mold employed for making the bolts.

Figure 5 is a sectional view taken on the line 5—5 of Figure 4.

Figure 6 is a view similar to Figure 4, but showing a modified form of mold, for fusing a mass of metal to some intermediate point of the length of the cable so as to form a rigid section of the cable.

Figure 7 is a diagrammatic view showing a subsequent operation of cutting the rigid section to form two bolt ends, and Figure 8 is a perspective view of an apparatus for forming the rigid end by hammer welding.

Referring to Figures 1 and 2, the bolt comprises a flexible shank 10 preferably formed of a steel wire cable, and rigid screw-threaded steel ends 11 which are adapted to receive the nuts, not shown. The ends 11 are formed of masses of steel in which the strands 16 of the cable are embedded, the metal of the strands being united with the surrounding metal so as to form a consolidated structure as indicated in section in Figure 2.

I preferably form the rigid ends 11 of the shank 10 by the so-called thermit process. For this purpose I may make use of a mold such as that shown at 30 in Figures 4 and 5. The interior of the mold is formed of alundum or similar refractory material, and, extending through the bottom of the mold are openings 31 formed in two rows. Each opening comprises a lower restricted portion 34 and an enlarged upper portion or space 35. The spaces 35 open upward into a common space 38 inside the mold. In forming the bolt ends in the mold shown in Figures 4 and 5, a wire cable is cut into lengths, each of approximately the length of the finished bolt. In case the cable has a hemp core, the core is removed from the ends of each length and these ends are inserted upwardly into two of the openings 31. To prevent the escape of the molten metal through the bottoms of the openings 31, I preferably seal the lower ends of the openings with plastic clay 36. When the lengths of cable are in position, as shown, I cover the bottom of the mold with a thermit mixture of such ingredients as to produce a metal of the composition desired for the ends of the bolts. The thermit mixture covers the bottom of the mold and fills the spaces 35. This mixture is then ignited, and the molten ferric material from the reaction of the ingredients of the mixture fills the spaces 35, flowing around and between the strands of the cable. On cooling and contraction the strands become firmly embedded in, and welded to, the surrounding mass of metal. The heat developed by the reaction is sufficient to fuse the ends of the cable strands or at least to soften the surface of the strands so that the surrounding metal becomes fused with the metal of the strands and so forms an integral mass therewith. If desired, the strands at the ends of the cable may be separated or unwound slightly so as better to permit the molten material to flow between and around the strands.

The cables are then removed from the mold, and the ends turned to cylindrical form and screw-threaded, the screw-threaded ends, as shown, being of somewhat greater diameter than the diameter of the shank. The solid ends of the bolt are made sufficiently long so that the inner portion of the end may be held in a suitable clamp while the outer portion is being screw-threaded. When the turns of the cable strands are right handed the screw threads at the ends of the cable should be left handed so that as the nut is tightened on the screw-threaded end it will tend to wind the strands rather than unwind them. When it is desired to form a bolt head at the end of the cable shank instead of the screwthreaded end, the spaces 35 in the bottom of the mold are formed square or hexagonal in cross section.

The refractory material forming the interior of a mold may be made in one piece and subsequently broken to remove the cables or, if desired, it may be formed of sections so that it may be taken apart and used again.

I may also form the ends of the bolt by casting masses of metal around a cable at spaced points along the length of the cable and subsequently divide the cable into lengths by cuts through the cable and added metal, leaving the added metal joined to the severed ends. By following this method a single mass of metal cast around the cable serves to form two bolt ends. In Figure 6 I illustrate one form of mold for casting the metal around the cable. As shown in this figure, the cable extends through the mold and through the molding chamber 40. Chamber 40 is in communication with chamber 41 which serves to hold the thermit material. On igniting the material the metal flows into the chamber 40 and around and between the strands of the cable. The cable is subsequently removed from the mold and cut at the center of the added metal as by means of the saw 43 shown in Figure 7, and the severed ends may subsequently be turned and screw-threaded.

The mold shown in Figure 6 may be a multiple mold of the same type as that shown in Figures 4 and 5. In the use of such a multiple mold a single long cable may be turned and passed through the mold a number of times, successive turns of the cable extending through successive chambers 40 of the mold.

In Figure 8 I show a means for forming the rigid ends by hammer welding a split metal sleeve around the flexible cable and at the same time forming the sleeve and cable strands into a consolidated mass. One-half of the wrought iron or soft steel split ring or sleeve 55 is held in the anvil block 56 beneath the cable 58 while the other half of the split ring rests on top of the cable below the movable die 59. A hammer 60 is adapted to strike the die 59 and force the split ring tightly on to the cable. A suitable burner 63 is employed to preheat the ring 55 and strands of the cable to a welding temperature prior to the hammering operation. Care should be taken in preheating the cable that not only the outer part of the strands of the cable are heated to a sufficient temperature to permit the welding of the strands to the sleeve, but also the strands should be so heated that when the cable is squeezed between the two halves of the ring the ring and the cable strands are welded into a unitary consolidated mass. The apparatus shown in Figure 8 may be so arranged that the cable may be fed forward through the apparatus after the welding operation, and a second sleeve welded to another portion of the cable and this operation repeated so as to form a series of spaced rigid sections on the cable. The cable may then be cut into lengths through the sections and the rigid ends of the lengths suitably finished.

In Figure 3 I show a modified form of bolt end, wherein the joint between the end of the cable and the shank is re-inforced by wires or flexible strands which are wound with the strands of the cable and preferably extend from the extreme end of the bolt inwardly for some distance beyond the screw-threaded portion. The outer ends of the added wires or strands are embedded in the metal welded to the cable end, and the inner ends of the re-inforcing wires are welded to the strands of the cable as is indicated at 75. If desired the added strands may also be welded to the cable strands along their length as well as at the inner ends. Any suitable means, such as an electric arc, may be employed for welding the added strands of the cable.

I claim:

1. A method of forming bolts having flexible shanks and rigid ends, which method consists in uniting by fusion to the strands of a steel cable at spaced points along the length of the cable, masses of metal so as to form with the strands of the cable unitary rigid structures, dividing the cable into lengths by transverse cuts through said structures and subsequently finishing the ends of said lengths to form bolt ends.

2. The method of the character described which consists in uniting to the strands of a steel cable a mass of metal so as to form with the strands of the cable a unitary rigid structure, dividing the structure into two parts by a transverse cut and subsequently finishing said parts to form bolt ends.

Signed at New York, in the county of New York and State of New York, this 5th day of March, A. D. 1928.

THOMAS LEONARD MacBEAN.